United States Patent [19]

Lee

[11] Patent Number: 5,956,622
[45] Date of Patent: Sep. 21, 1999

[54] DEVICE FOR GENERATING CALLING VIBRATIONS OR CALLING SOUNDS IN CELLULAR OR PAGER PHONES

[75] Inventor: Jong Bae Lee, Seoul, Rep. of Korea

[73] Assignee: Shinwoo Audio Co., Ltd., Seoul, Rep. of Korea

[21] Appl. No.: 08/936,524

[22] Filed: Sep. 24, 1997

[30] Foreign Application Priority Data

Apr. 7, 1997 [KR] Rep. of Korea .................. 97-7103

[51] Int. Cl.$^6$ .............................. H04B 7/00; H04B 1/38
[52] U.S. Cl. .................. 455/38.2; 455/567; 455/31.2; 340/825.46; 340/407.1; 381/396
[58] Field of Search .................. 455/38.2, 90, 351, 455/550, 567, 575, 31.1, 31.2, 31.3; 340/825.44, 825.46, 407.1; 379/383, 374, 375, 428, 433; 381/396, 412

[56] References Cited

U.S. PATENT DOCUMENTS

| 5,107,540 | 4/1992 | Mooney et al. | 381/396 |
|---|---|---|---|
| 5,172,092 | 12/1992 | Nguyen et al. | 340/825.46 |
| 5,327,120 | 7/1994 | McKee et al. | 340/825.46 |
| 5,469,133 | 11/1995 | Hensler et al. | 455/38.2 |
| 5,488,351 | 1/1996 | Hedayatnia et al. | 340/825.46 |
| 5,554,971 | 9/1996 | Foster et al. | 340/825.46 |
| 5,602,432 | 2/1997 | Mizutani | 340/825.46 |
| 5,604,816 | 2/1997 | Totani | 381/396 |
| 5,619,181 | 4/1997 | Murray | 340/825.46 |
| 5,642,413 | 6/1997 | Little | 340/825.46 |
| 5,651,052 | 7/1997 | Serrano | 455/567 |
| 5,682,132 | 10/1997 | Hiroyoshi et al. | 340/407.1 |
| 5,764,751 | 6/1998 | Konishi | 379/373 |
| 5,861,686 | 1/1999 | Lee | 381/396 |

Primary Examiner—Dwayne D. Bost
Assistant Examiner—Quochien B. Vuong
Attorney, Agent, or Firm—Smith, Gambrell & Russell, LLP

[57] ABSTRACT

An integrated device for selectively generating calling vibrations or calling sounds in cellular or pager phones is disclosed. In the device, two vibration members are set in the upper and lower portions of a casing, respectively. The two vibration members respectively respond to low and high frequencies applied from the PCB of a phone to the coil of an electromagnet, thus generating calling vibrations and calling sounds. The device thus selectively generates calling vibrations or calling sounds in accordance with a selected mode. The device of this invention has a simple construction with a reduced number of elements, thus simplifying the production process and reducing the production cost of cellular or pager phones. The device also accomplishes the recent trend of compactness, thinness and lightness of such phones.

1 Claim, 2 Drawing Sheets

DEVICE FOR GENERATING CALLING VIBRATIONS OR CALLING SOUNDS IN CELLULAR OR PAGER PHONES

BACKGROUND OF THE INVENTION

1. Field of the Invention

The present invention relates, in general, to a device for generating calling vibrations or calling sounds in cellular or pager phones and, more particularly, to an integrated device for selectively generating calling vibrations or calling sounds in cellular or pager phones thus being capable of accomplishing the recent trend of compactness, thinness and lightness of such phones.

2. Description of the Prior Art

In a typical cellular or pager phone, a vibrator for generating calling vibrations is comprised of a pendulum, which is eccentrically mounted to the tip of the rotating shaft of a rotor with a stator surrounding the rotating shaft of the rotor. When the stator is turned on, the rotor is rotated along with the rotating shaft thus making the pendulum eccentrically rotate while generating calling vibrations. The typical cellular or pager phones also individually have a buzzer, which is separated from the vibrator and is to generate calling sounds. The typical cellular or pager phones thus allow users to select the operational mode between a vibration mode and a sound mode.

Since both the vibrator, with both a long rotating shaft and a large-diameter stator, and the buzzer are separately provided in a cellular or pager phone, the typical cellular or pager phones fail to accomplishing the recent trend of compactness, thinness and lightness.

The separated vibrator and buzzer also increase the number of elements of the cellular or pager phones, thus complicating the production process and increasing the production cost of such phones.

SUMMARY OF THE INVENTION

Accordingly, the present invention has been made keeping in mind the above problems occurring in the prior art. An object of the present invention is to provide an integrated device for selectively generating calling vibrations or calling sounds in cellular or pager phones, thus being capable of accomplishing the recent trend of compactness, thinness and lightness of the cellular or pager phones.

In order to accomplish the above object, the present invention provides a device for selectively generating calling vibrations or calling sounds in cellular or pager phones, comprising: a thin cylindrical casing having top and bottom annular steps at its both ends, the casing also having two PCB terminals at its bottom end; an electromagnet comprised of: a yoke provided with both an annular magnet seat at its bottom edge and a depressed seat at its top center; an annular magnet attached to the magnet seat of the yoke from the bottom to the top; and an annular coil connected to the PCB terminals of the casing at its both ends and positioned relative to the annular magnet so as to selectively form an electromagnetic field between the coil and the magnet; a holder seated into the depressed seat of the yoke; a first vibration member provided with a symmetrically and geometrically-shaped vibration rib and adapted for selectively generating calling vibrations, the first vibration member being seated on the top of the holder and integrated with the yoke and holder by an eyelet into an integrated body, the integrated body being set into the casing from the top to the bottom with the first vibration member being seated on the top step of the casing at the outside edge of the vibration rib; a second vibration member adapted for selectively generating calling sounds, the second vibration member concentrically holding the coil of the electromagnet at its top center and being set into the casing from the bottom to the top, thus being seated on the bottom step of the casing at its outside edge; and two rings fitted into both ends of the casing, thus holding the first and second vibration members seated on the top and bottom steps of the casing.

BRIEF DESCRIPTION OF THE ACCOMPANYING DRAWINGS

The above and other objects, features and other advantages of the present invention will be more clearly understood from the following detailed description taken in conjunction with the accompanying drawings, in which:

FIG. 1 is an exploded perspective view showing the construction of an integrated device for selectively generating the calling vibrations or calling sounds in cellular or pager phones in accordance with the preferred embodiment of the present invention; and FIG. 2 is a sectional view of the assembled device of FIG. 1.

DESCRIPTION OF THE PREFERRED EMBODIMENTS

Figure 1:
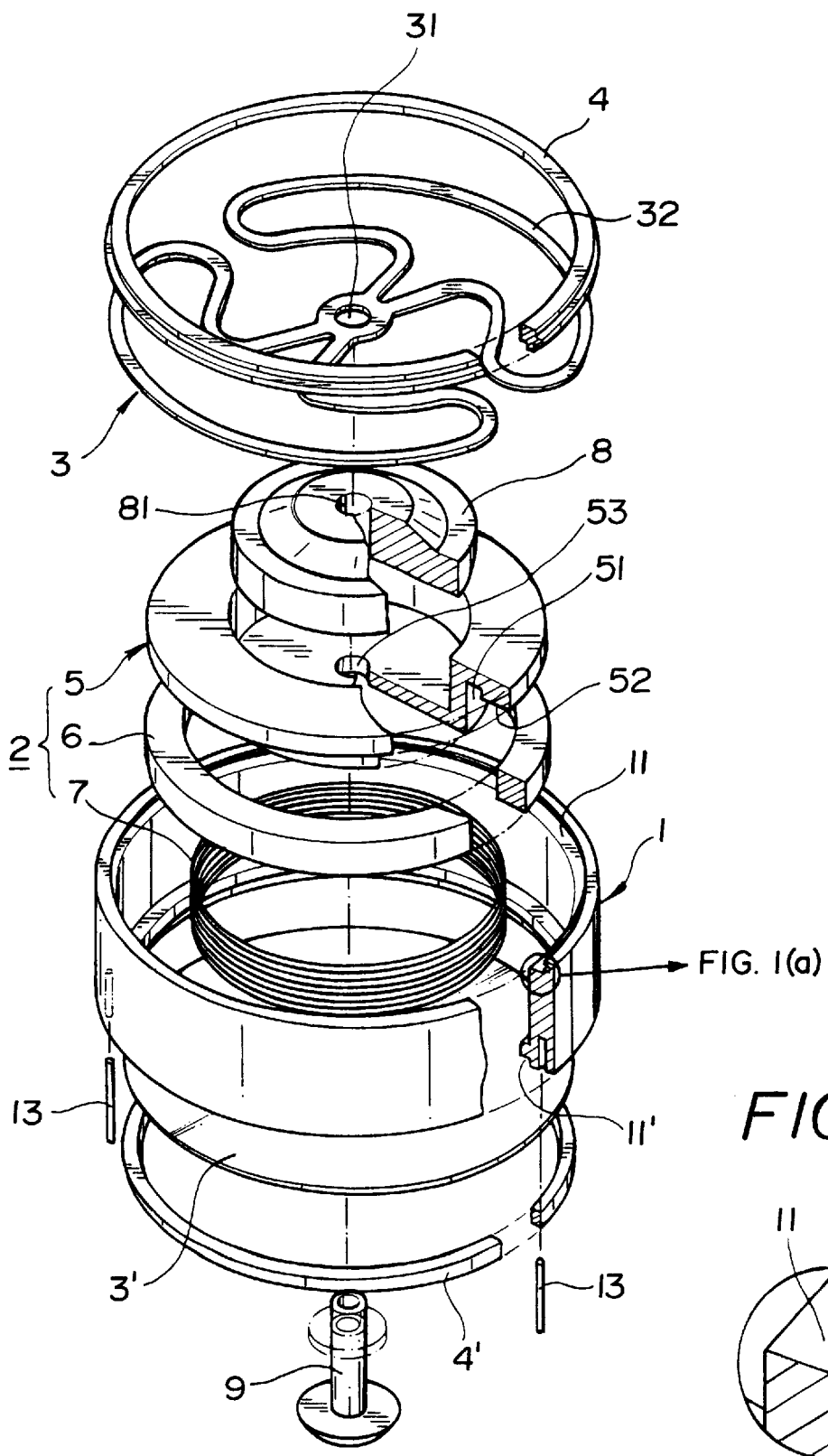
Figure 1A:
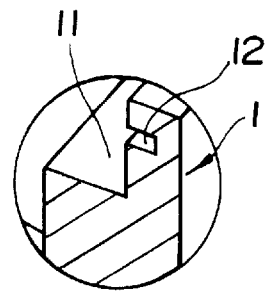
Figure 2:
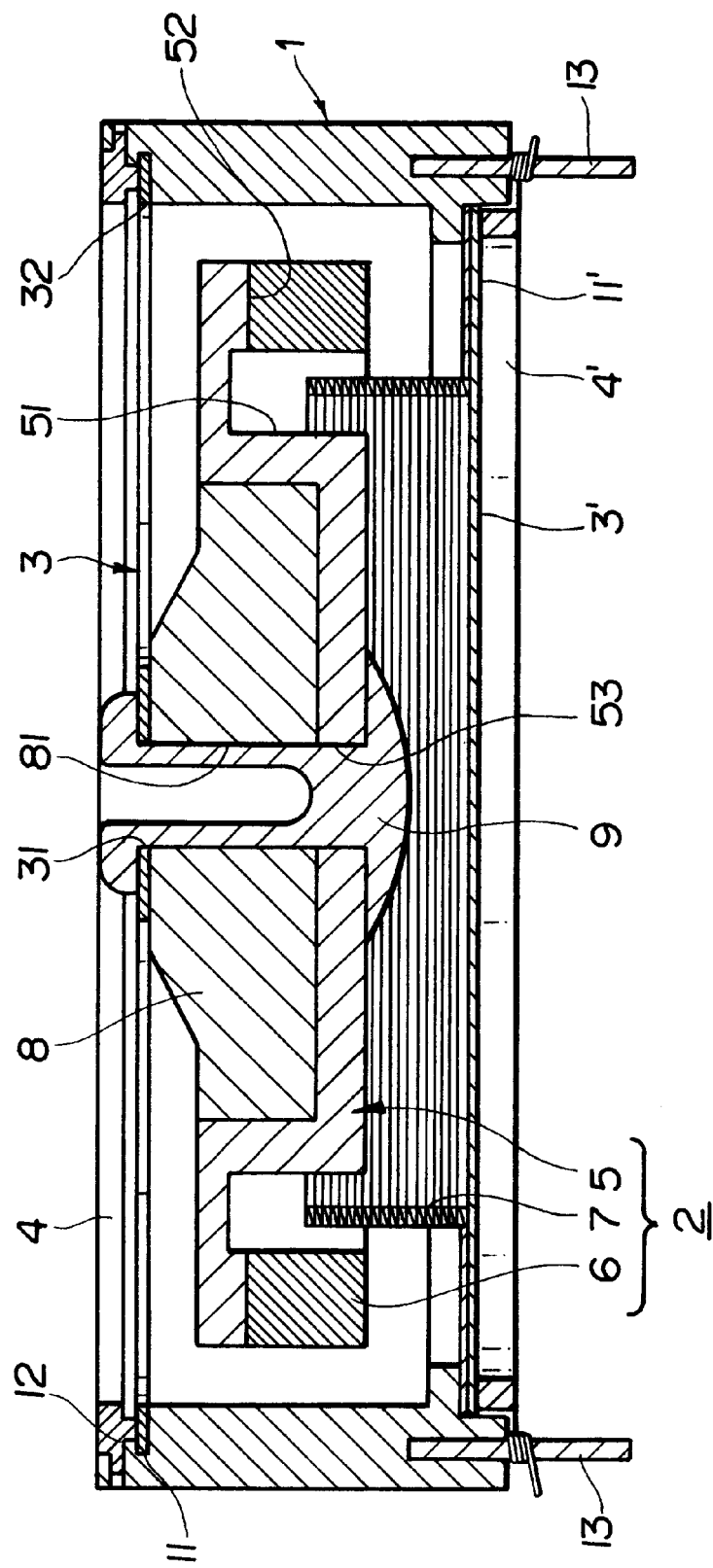

FIGS. 1 and 2 show the construction of an integrated device for selectively generating the calling vibrations or calling sounds in cellular or pager phones in accordance with the preferred embodiment of this invention. As shown in the drawings, the device of this invention is comprised of one electromagnet 2 and two vibration members 3 and 3', which are all encased by a cylindrical casing 1. Of the two vibration members 3 and 3', the first member 3 is to generate calling vibrations, while the second member 3' is to generate calling sounds as will be described in detail later herein.

The casing 1 is made of a nonconductive material such as a synthetic resin and has a thin tubular configuration. The casing 1 is stepped at its top and bottom open ends, thus forming top and bottom annular steps 11 and 11'.

Of the two annular steps 11 and 11', the top step 11 is provided with an annular groove 12 for holding a first ring 4 when the ring 4 is forcibly fitted into the top end of the casing 1 with the first vibration member 3 being tightly positioned between the step 11 and the ring 4 at its outside edge. Meanwhile, a second ring 4' is forcibly fitted into the bottom end of the casing 1, with the second vibration member 3' being tightly positioned between the bottom step 11' and the ring 4' at its outside edge.

The electromagnet 2 is comprised of a yoke 5, an annular magnet 6 and an annular coil 7.

The yoke 5 is thinner than the height of the interior wall of the casing 1, with a vertical wall 51 of the yoke 5 having an outer diameter smaller than the inner diameter of the coil 7. The yoke 5 also has a depressed seat at its top center and an annular magnet seat 52 at its bottom edge outside the vertical wall 51, thus allowing the annular magnet 6 to be attached to the magnet seat 52 from the bottom to the top.

A holder 8 is seated in the depressed seat of the yoke 5 with the first vibration member 3 being seated on the top of the holder 8. In this case, the first vibration member 3, the yoke 5 and the holder 8 individually have an eyelet hole 31, 53, 81 so that the vibration member 3 and holder 8 are seated on the yoke 5, with their eyelet holes 31 and 81 being aligned with the eyelet hole 53 of the yoke 5. Thereafter, an eyelet 9 is fitted into the aligned holes 31, 81 and 53 thus integrating the vibration member 3 and holder 8 with the yoke 5 into an integrated body.

The coil 7 is formed by winding coils into an annular shape of a certain diameter, the diameter allowing the coil 7 to be smoothly received in an annular groove defined between the inside surface of the annular magnet 6 and the outside surface of the annular vertical wall 51 of the yoke 5. The bottom of the coil 7 is concentrically attached to the top center of the second vibration member 3'.

Provided at the bottom end of the casing 1 are two PCB terminals 13, through which the coil 7 is connected to the printed circuit board (PCB, not shown) of a cellular or pager phone.

The first vibration member 3 has a geometrically-shaped rib 32, which is symmetrically arranged around the center with the eyelet hole 31 and is integrated with the eyelet holed center into a single structure. The first vibration member 3, with such a symmetric and geometric rib 32, is easily vibrated at low frequencies thus effectively generating calling vibrations when the device is set by a user into a vibration mode. Meanwhile, the second vibration member 3' is a thin disc, which generates vibration sounds at high frequencies thus effectively generating calling sounds when the device is set into a sound mode.

The elements of the device are assembled into a single body as follows.

The annular magnet 6 is primarily attached to the magnet seat 52 of the yoke 5 from the bottom to the top. In addition, both the holder 8 and the first vibration member 3 are integrated with the yoke 5 into an integrated body. In this case, the holder 8 is seated into the depressed seat of the yoke 5 prior to seating the first vibration member 3 onto the holder 8, with the eyelet holes 31, 81 and 53 being aligned together. Thereafter, an eyelet 9 is fitted into the aligned eyelet holes 31, 81 and 53 prior to integrating the vibration member 3, holder 8 and yoke 5 into a single body through, for example, a caulking process.

Meanwhile, the coil 7 is integrated with the second vibration member 3', with the bottom of the coil 7 being concentrically attached to the top center of the second vibration member 3'. In this case, both ends of the coil 7 are fully pulled out, thus being connected to the PCB terminals 13 of the casing 1 when the second vibration member 3' with the coil 7 is set into the casing 1.

The integrated body of the first vibration member 3, holder 8 and yoke 5 with the eyelet 9 is set into the casing 1 from the top to the bottom. The yoke 5 of the integrated body is suspended in the casing 1, while the symmetric rib 32 of the first vibration member 3 is seated on the top step 11 of the casing 1 at its outside edge. Thereafter, the position of the integrated body in the casing 1 is fixed by the ring 4 which is forcibly fitted into the top end of the casing 1.

Meanwhile, the second vibration member 3' with the coil 7 is set into the casing 1 from the bottom to the top, with the edge of the member 3' being seated onto the bottom step 11 of the casing 1 and the coil 7 being positioned inside the casing 1. Both ends of the coil 7 are led into the outside of the casing 1.

In this case, the coil 7 is smoothly received in the annular groove defined between the inside surface of the annular magnet 6 and the outside surface of the vertical wall 51 of the yoke 5. Therefore, when an electromagnetic force is generated between the coil 7 and the magnet 6 and thus vibrates the two vibration members 3 and 3', neither the yoke 5 nor the magnet 6 interferes with the coil 7.

After seating the second vibration member 3' onto the bottom step 11' of the casing 1, the ring 4' is forcibly fitted into the bottom end of the casing 1 thus fixing the position of the member 3' with the coil 7 in the casing 1. Thereafter, both ends of the coil 7 are connected to the PCB terminals 13 of the casing 1, thus completely forming the device of this invention as shown in FIG. 2.

During a process of producing a cellular or pager phone, the device of this invention is set in the phone by mounting the terminals 13 of the casing 1 onto the PCB (not shown) of the phone.

In the operation of the device, a user freely selects one of the two modes: a vibration mode performed by the first vibration member 3 and a sound mode performed by the second vibration member 3'. When a user selects one of the two modes, the PCB of the cellular or pager phone outputs a high or low frequency to the coil 7 of the device in response to a calling signal. In this case, the output frequency is automatically controlled by the PCB in accordance with a selected mode of the device.

When the frequency is applied from the PCB to the coil 7 of the device, an electromagnetic field is formed between the magnet 6 and the coil 7, thus moving both the yoke 7 and the coil 7 in the axial direction of the casing 1 while vibrating one of the two vibration members 3 and 3'.

In this case, the vibrating direction of each member 3, 3' is equal to the vibrating direction of the yoke 5 and coil 7 or the axial direction of the eyelet 9.

When the device is set into a vibration mode, the PCB of the phone outputs a low frequency to the coil 7 of the device thus causing the first vibration member 3 to be vibrated. In this case, the vibrations of the member 3 are similar to the beating vibrations of fingers and are clearly sensed by a user.

Meanwhile, when the device set into a sound mode, the PCB of the phone outputs a high frequency to the coil 7, thus causing the second vibration member 3' to be vibrated with the coil 7. In this case, the second vibration member 3' is quickly vibrated by the high frequency thus generating prominent vibration sounds or calling sounds.

As described above, the present invention provides an integrated device for selectively generating calling vibrations or calling sounds in cellular or pager phones. In the device, two vibration members are set in the upper and lower portions of a casing, respectively. The two vibration members respectively respond to low and high frequencies applied from the PCB of a phone to the coil of an electromagnet, thus generating calling vibrations and calling sounds. Therefore, the device of this invention selectively generates calling vibrations or calling sounds in accordance with a selected mode. The integrated device of this invention has a simple construction with a reduced number of elements, thus simplifying the production process and reducing the production cost of cellular or pager phones. Another advantage of the device resides in that it accomplishes the recent trend of compactness, thinness and lightness of the cellular or pager phones and allows the phones to be easily carried by users.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for selectively generating calling vibrations or calling sounds in cellular or pager phones, comprising:

a thin cylindrical casing having top and bottom annular steps at its both ends, said casing also having two PCB terminals at its bottom end;

an electromagnet comprised of:
  a yoke provided with both an annular magnet seat at its bottom edge and a depressed seat at its top center;
  an annular magnet attached to said magnet seat of the yoke from the bottom to the top; and
  an annular coil connected to said PCB terminals of the casing at its both ends and positioned relative to the annular magnet so as to selectively form an electromagnetic field between the coil and the magnet;

a holder seated into said depressed seat of the yoke;

a first vibration member provided with a symmetrically and geometrically-shaped vibration rib and adapted for selectively generating calling vibrations, said first vibration member being seated on the top of said holder and integrated with the yoke and holder by an eyelet into an integrated body, said integrated body being set into the casing from the top to the bottom with the first vibration member being seated on the top step of the casing at the outside edge of the vibration rib;

a second vibration member adapted for selectively generating calling sounds, said second vibration member concentrically holding the coil of said electromagnet at its top center and being set into the casing from the bottom to the top, thus being seated on the bottom step of the casing at its outside edge; and two rings fitted into both ends of the casing, thus holding the first and second vibration members seated on the top and bottom steps of the casing.

* * * * *